(12) United States Patent
Liu (10) Patent No.: US 11,453,571 B2
(45) Date of Patent: Sep. 27, 2022

(54) GOVERNOR ASSEMBLY FOR ELEVATOR SYSTEM, ELEVATOR SAFETY SYSTEM AND ELEVATOR SYSTEM

(71) Applicant: Otis Elevator Company, Farmington, CT (US)

(72) Inventor: Zhiren Liu, Shanghai (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 233 days.

(21) Appl. No.: 16/725,372

(22) Filed: Dec. 23, 2019

(65) Prior Publication Data
US 2020/0407193 A1    Dec. 31, 2020

(30) Foreign Application Priority Data

Jun. 27, 2019  (CN) .......................... 201910566549.X (51) Int. Cl.
| | |
|---|---|
| *B66B 5/04* | (2006.01) |
| *B66B 5/22* | (2006.01) |
| *B66B 5/20* | (2006.01) |
| *B66B 5/24* | (2006.01) |
| *B66B 9/00* | (2006.01) |
| *F16D 127/00* | (2012.01) |
| *F16D 129/04* | (2012.01) |

(52) U.S. Cl.
CPC ................ *B66B 5/044* (2013.01); *B66B 5/22* (2013.01); *B66B 5/20* (2013.01); *B66B 5/24* (2013.01); *B66B 9/00* (2013.01); *F16D 2127/002* (2013.01); *F16D 2129/043* (2013.01)

(58) Field of Classification Search
CPC .............. B66B 5/044; B66B 5/24; B66B 5/20
See application file for complete search history.

(56) References Cited

U.S. PATENT DOCUMENTS 9,517,918 B2    12/2016  Dube et al.
10,526,170 B2 *  1/2020  Shiraishi ................. B66B 5/044

FOREIGN PATENT DOCUMENTS

| DE | 202019105089 U1 * | 2/2020 | ............. B66B 5/044 |
| JP | S49118471 A | 11/1974 | |
| WO | 2011146050 A1 | 11/2011 | |

OTHER PUBLICATIONS

English Machine Translation of DE 20 2019 105 089 Feb. 2020.*
European Search Report for application EP 19219638.4, dated Jul. 20, 2020, 37 pages.

* cited by examiner

*Primary Examiner* — Diem M Tran
(74) *Attorney, Agent, or Firm* — Cantor Colburn LLP (57) ABSTRACT

An overspeed governor assembly for an elevator system, an elevator safety system, and an elevator system. The overspeed governor assembly comprises an overspeed governor, a linkage provided to enable the overspeed governor to associate with a safety device of the elevator, when an elevator car overspeed is occurring, to trigger the safety device to perform safety measures, and at least one torsion spring coupled between a sheave and a centrifugal mechanism in the overspeed governor for providing a pre-set load, and the centrifugal force formed by the centrifugal mechanism when the elevator car overspeed is occurring, is greater than the pre-set load, for triggering the safety device via the linkage.

11 Claims, 5 Drawing Sheets

GOVERNOR ASSEMBLY FOR ELEVATOR SYSTEM, ELEVATOR SAFETY SYSTEM AND ELEVATOR SYSTEM

FOREIGN PRIORITY

This application claims priority to Chinese Patent Application No. 201910566549.X filed Jun. 27, 2019, and all the benefits accruing therefrom under 35 U.S.C. § 119, the contents of which in its entirety are herein incorporated by reference.

FIELD OF THE INVENTION

The present invention relates to the technical field of elevators, in particular, to an overspeed governor assembly for an elevator system, an elevator safety system and an elevator system.

BACKGROUND

Elevators have been widely used in modern society, which bring great conveniences to peoples' work and daily life. Numerous types of elevator installations, equipment or systems have been provided in the prior art to meet a variety of different application requirements. Nevertheless, the existing elevator installations, equipment or systems still have some drawbacks and deficiencies in some aspects such as structural construction, safety and reliability, manufacturing and work performance, which can be further improved or optimized.

SUMMARY OF THE INVENTION

In view of the foregoing, the present invention provides an overspeed governor assembly for an elevator system, an elevator safety system, and an elevator system, thereby one or more of the existing problems described above as well as problems of other aspects having been resolved or at least relieved.

Firstly, according to the first aspect of the present invention, it is provided an overspeed governor assembly for an elevator system, comprising: an overspeed governor; and a linkage provided to enable the overspeed governor to associate with a safety device of the elevator, when an elevator car overspeed is occurring, to trigger the safety device to perform safety measures; the overspeed governor comprises at least one torsion spring coupled between a sheave and a centrifugal mechanism in the overspeed governor for providing a pre-set load, and the centrifugal force formed by the centrifugal mechanism when the elevator car overspeed is occurring, is greater than the pre-set load, for triggering the safety device via the linkage.

In the overspeed governor assembly according to the invention, optionally, the centrifugal mechanism is mounted, via at least one shaft, on the sheave for rotating therewith, at least one of the torsion springs is fitted around at least one of the shafts and a first end and a second end thereof are coupled to the sheave and the centrifugal mechanism, respectively.

In the overspeed governor assembly according to the invention, optionally, there are two or more shafts uniformly arranged along the circumferential direction of the sheave.

In the overspeed governor assembly according to the invention, optionally, the shaft is mounted on the side of the sheave facing the centrifugal mechanism, and an accommodating portion is provided in the outer peripheral area of the shaft, for accommodating the first end of the torsion spring; and/or a receiving portion is provided on the side of the centrifugal mechanism facing the sheave, for receiving the second end of the torsion spring.

In the overspeed governor assembly according to the invention, optionally, the accommodating portion is configured as two or more slots arranged along the circumferential direction of the shaft; and/or the first end is configured to have an operating portion being operable to decouple the first end from the accommodating portion after the first end is accommodated in the accommodating portion.

In the overspeed governor assembly according to the invention, optionally, the slots are configured to have at least a first portion and a second portion, the first portion being different from the second portion in the axial direction and/or the radial direction of the shaft.

In the overspeed governor assembly according to the invention, optionally, the first portion is farther away from the centrifugal mechanism in the axial direction than the second portion and closer to the central axis of the shaft in the radial direction than the second portion, and the first end is configured to have a first section accommodated in the first portion, and a second section in which the operating portion is disposed and configured to have an outward protrusion after the second section is accommodated in the second portion.

In the overspeed governor assembly according to the invention, optionally, the second end is configured to have an extension extending along the axial direction of the torsion spring, and the receiving portion is configured as a hole for receiving at least a portion of the extension.

In the overspeed governor assembly according to the invention, optionally, the sheave and the safety device are mounted on the elevator car.

In the overspeed governor assembly according to the invention, optionally, the safety device is a safety tongs pulling mechanism, and the linkage is configured in the shape of an arm for being coupled to the safety tongs pulling mechanism.

Further, according to the second aspect of the present invention, it is provided an elevator safety system, comprising: a safety device configured to perform safe measures when an elevator car overspeed is occurring; and an overspeed governor assembly for an elevator system according to any one of the above-described overspeed governor assemblies, arranged to trigger the safety device when the elevator car overspeed is occurring.

In addition, according to the third aspect of the present invention, it is provided an elevator system, comprising: a guide rail; an elevator car being movable along the guide rail; and an overspeed governor assembly for an elevator system according to any one of the above-described overspeed governor assemblies, arranged to trigger an safety device of the elevator to perform safe measures when an elevator car overspeed is occurring.

The principles, characteristics, features and advantages of various technical solutions of the present invention will be clearly understood from the following descriptions in combination with the drawings. For example, the overspeed governor assemblies and systems of the invention are easy to be installed, manufactured and maintained. The pre-set load of the spring in the overspeed governor can be conveniently and flexibly set and adjusted, not only without being limited by the internal installation space of the overspeed governor, but also allowing a pre-set spring load larger than the existing overspeed governors, which can even reach up to the limit of the torsion spring itself. As a result, the application range of the overspeed governors can be effectively expanded, also improving the work performance of the overspeed governors and enhancing the safety and reliability of the elevators significantly.

BRIEF DESCRIPTION OF THE DRAWINGS

The technical solutions of the present invention will be further described in detail below in conjunction with the drawings and embodiments. However, it should be understood that the drawings are designed merely for illustrative purpose and are intended only to conceptually explain the configurations described herein. It is unnecessary to draw the drawings in proportion.

DETAILED DESCRIPTION OF THE INVENTION

First, it should be noted that the configurations, arrangements, features and advantages of the overspeed governor assembly for an elevator system, an elevator safety system, and an elevator system according to the present invention will be described hereinafter by way of examples. None of these descriptions, however, should in any way limit the invention. In the context of the present application, the technical term "connect (or couple, etc.)" encompasses the circumstances where a particular component is directly connected to another component and/or indirectly connected to another component. The technical terms "first" and "second" are used merely for discriminative purpose and are not intended to indicate their order or relative importance. Moreover, as for any single technical feature described or implied in the embodiments mentioned herein, or any single technical feature described or implied in the various figures, the present invention still allows any further combination or deletion of these technical features (or equivalents thereof) without any technical impediment, and therefore it should be considered that more of such embodiments according to the invention are also within the scope of the disclosure contained in the application. In addition, the same or similar components and features may be labeled in only one or several places in the same drawing for the sake of simplicity, and the general matters that are well known to those skilled in the art are not described in detail herein.

Figure 1:
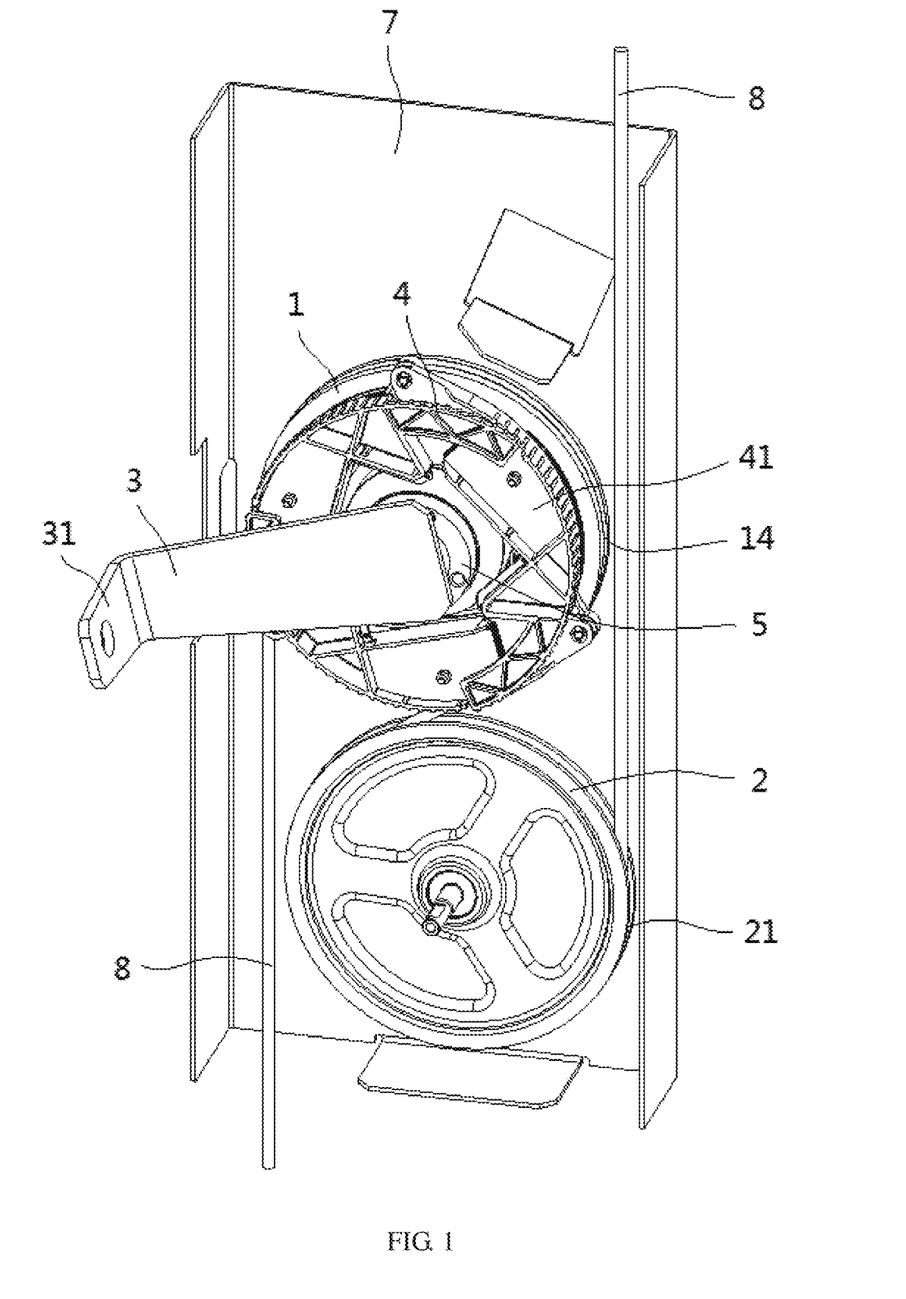
FIG. 1 is a partial perspective view illustrating the arrangement of an embodiment of the overspeed governor assembly according to the present invention in an elevator system.

An overview of an embodiment of the overspeed governor assembly in accordance with the invention installed in an elevator system is schematically illustrated in FIG. 1, and the structural arrangements of the overspeed governor assembly embodiment are further illustrated in FIGS. 2 to 7. The invention will be described in detail herein after through the embodiment and with reference to these drawings.

As shown in FIG. 1, the overspeed governor assembly may comprise a first sheave 1, a second sheave 2, a linkage 3, a centrifugal mechanism 4 and a connecting member 5. All the above members except the linkage 3 belong to, and are a part of, the overspeed governor. Of course, as for an overspeed governor in the overspeed governor assembly, the invention is not limited to the specific embodiments described herein, and it is completely possible to adopt other configurational forms.

In the above overspeed governor assembly, the centrifugal mechanism 4, which is arranged to provide a centrifugal force, may be mounted on the first sheave 1, and the first sheave 1 and the second sheave 2 may be adjacent to each other and rotatably mounted to an elevator car (not shown). For example, in the illustrated embodiment, both the first sheave 1 and the second sheave 2 are mounted on the base plate 7, thereby constituting what is commonly referred to in the art as "car mounted" overspeed governor assembly. The base plate 7 mentioned above may be made of any suitable material such as sheet metal, and it is attached to the elevator car to provide an installation location for the first sheave 1, the second sheave 2, the safety device (not shown) and the like in the elevator. Of course, in some specific application situations, it is possible to install the first sheave 1, the second sheave 2 and the like at other installation locations such as on the top of the elevator shaft or in the machine room.

In the embodiment shown in FIG. 1, the rope 8 such as a wire rope may be fixed on the top of the elevator shaft and allowed to hang freely, and a heavy object may be used at the bottom of the elevator shaft to keep the rope 8 tight. As shown in FIG. 1, when the elevator is in operation, the elevator car moves up and down in the elevator shaft under the traction force exerted by a power device via the rope 8. The rope 8 will wind and move around the first sheave 1 and the second sheave 2 by passing the wheel groove 14 on the first sheave 1 and the wheel groove 21 on the second sheave 2, respectively. Since the second sheave 2 usually has no other components disposed thereon and its direction of rotation is exactly opposite to that of the first sheave 1, the second sheave 2 is often referred to as an "idler sheave" or "diversion sheave" or the like. It should be understood that in some embodiments the second sheave 2 may be removed and only the first sheave 1 is used.

Figure 2:
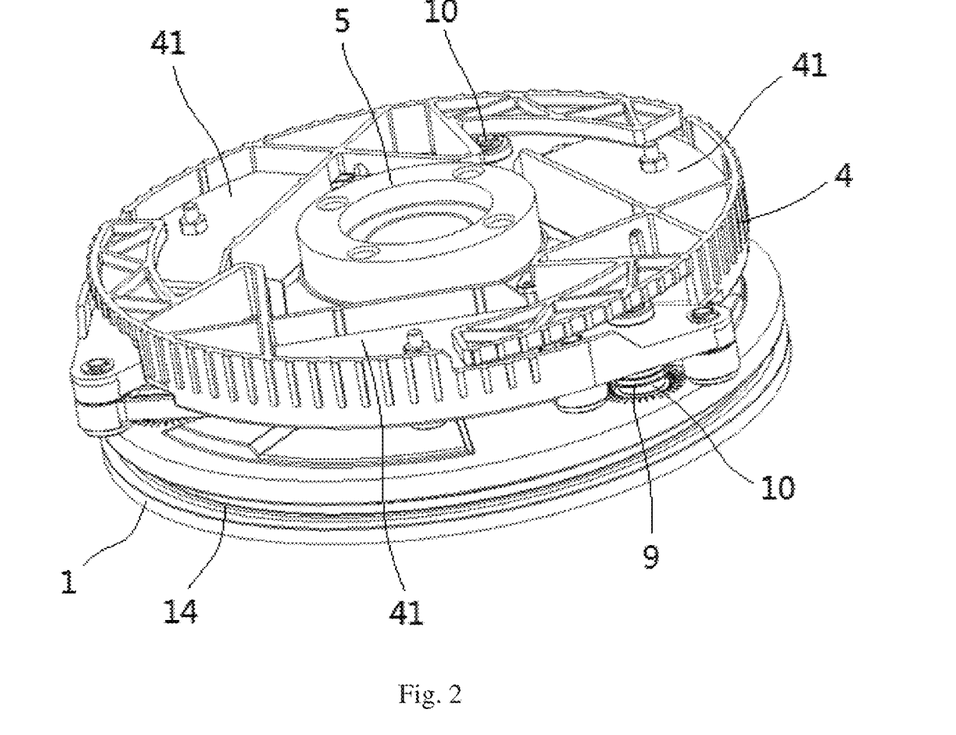
FIG. 2 is a perspective view of a portion of the overspeed governor assembly embodiment depicted in FIG. 1, also showing a sheave and a centrifugal mechanism.

The centrifugal mechanism 4 may be mounted on the first sheave 1 for rotating therewith. In actual applications, the centrifugal mechanism 4 may be implemented in any possible construction forms. By way of example, one or more weight members 41 may be disposed in the centrifugal mechanism 4, as shown in FIG. 2. For example, a plurality of iron sheets, steel sheets, or the like may be stacked together or a metal block may be used, to form such a weight member 41, so that a centrifugal force can be generated during the rotation of the centrifugal mechanism 4 together with the first sheave 1. Optionally, several such weight members 41 may be uniformly arranged along the circumferential direction of the centrifugal mechanism 4 so that the centrifugal force can be distributed as uniformly as possible, thereby preventing undesirable vibration, noise and damage to the components due to uneven force.

Referring to FIGS. 2 to 7, according to the design concept of the present invention, one or more torsion springs 9 may be coupled between the sheave and the centrifugal mechanism 4 in the overspeed governor assembly according to application requirements, and a pre-set load may be provided through this or these torsion springs 9. When facing different application requirements, utilizing the above approach allows a very quick, convenient and flexible set-up or adjustment of the pre-set load between the sheave and the centrifugal mechanism 4, which cannot be accomplished by utilizing an extension spring commonly used in the prior art. A detailed demonstration through comparison will be provided hereinafter to help to fully understand the design ideas, technical advantages and the like of the present invention.

By arranging the above torsion spring 9 in the overspeed governor assembly, when the elevator car is in a state of overspeed, the centrifugal force formed by the centrifugal mechanism 4 will overcome the pre-set load provided by the torsion spring 9. That is, at this time the centrifugal force will be greater than the pre-set load, so that the linkage 3 can be actuated to trigger the safety device to perform safe measures such as speed limit, brake operation, etc. on the elevator car. An exemplary description will be provided below in connection with the embodiment.

As shown in FIGS. 1 and 2, a connecting member 5 may be provided to associate with the centrifugation mechanism 4. The connecting member 5 may take any suitable form, such as a trip ring, an engagement gear, etc., and it is arranged in such a manner that only when the elevator car is over-speeding and at that time the centrifugal force provided by the centrifugal mechanism 4 has exceeded the original pre-set load, the centrifugal mechanism 4 can connect the connecting member 5 with the first sheave 1 so that the connecting member 5 can drive the linkage 3 connected thereto to move and therefore trigger the safety device to perform safety measures. This is to say, at this time a linkage between the overspeed governor and the safety device can be achieved via the linkage 3 and the safety device can be triggered to start working. The current condition of elevator car over-speeding can then be safely controlled to reduce the movement speed of the elevator car, thereby solving the safety problems caused by the elevator car overspeed and ensuring personal and property safety in a timely and effective manner.

By way of example, the above-mentioned safety device may take the form of a safety tongs pulling mechanism or any other mechanism, device or equipment. Optionally, the linkage 3 may be configured as an arm structure as shown in FIG. 1 (or referred to as a rod-like structure), and its one end 31 may be connected to the above-mentioned safety tongs pulling mechanism, for example, by a connecting member such as an extension spring, to trigger the safety tongs pulling mechanism for safe measures in the case where an elevator car overspeed is occurring.

Figure 3:
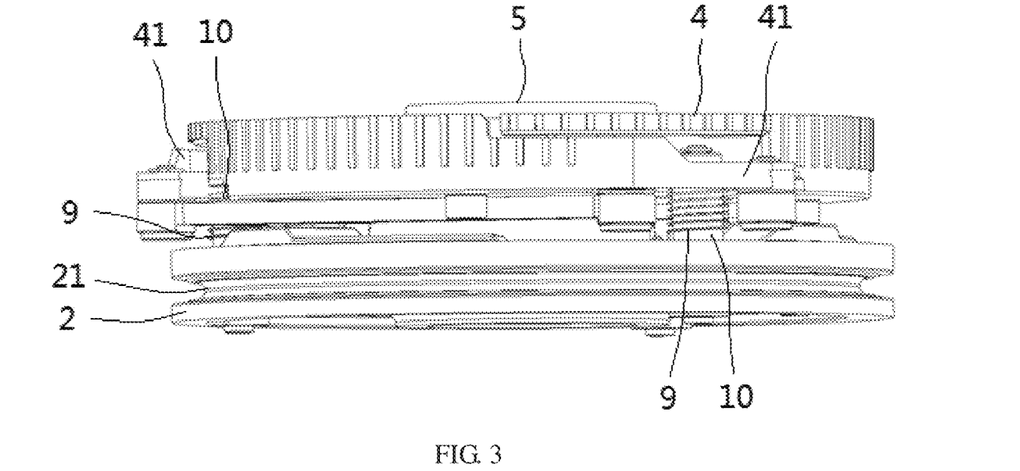
FIG. 3 is a side elevational view of the portion of the overspeed governor assembly embodiment shown in FIG. 2.
Figure 4:
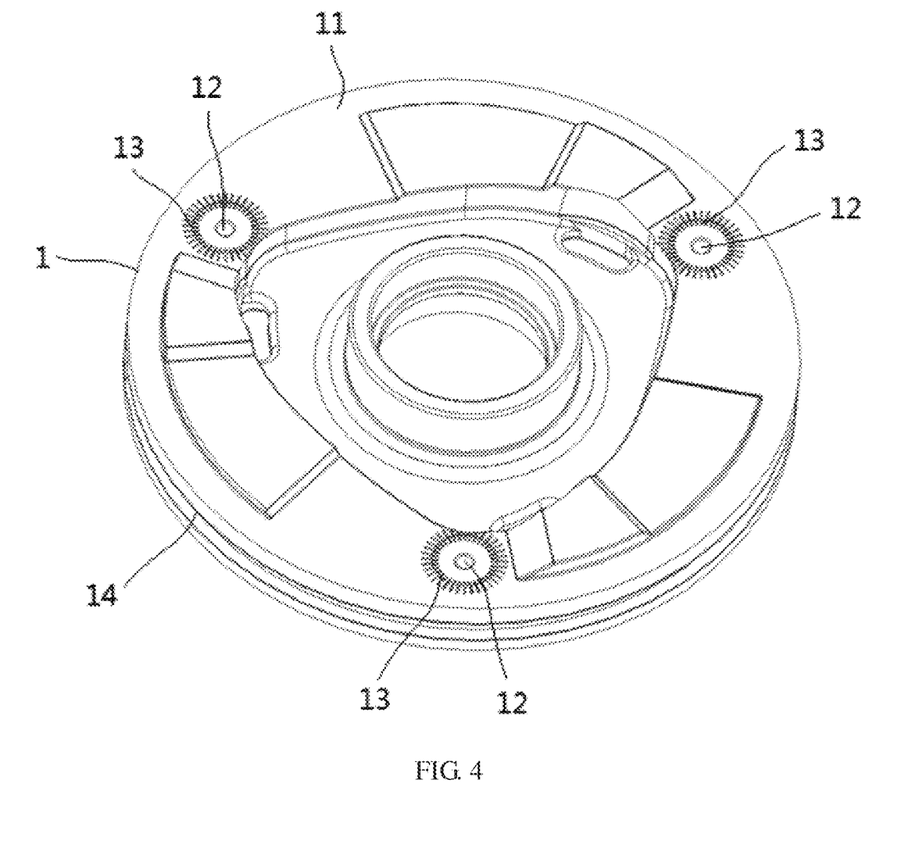
FIG. 4 is a perspective view of the sheave in the portion shown in FIG. 2.

As shown in FIG. 2, FIG. 3 or FIG. 4, the centrifugal mechanism 4 may be mounted on the first sheave 1 by, for example, one or more shafts 10, so that it can rotate together with the first sheave 1. In a specific application, the structural dimension, arrangement position, amount, installation manner and the like of the above shaft 10 can be flexibly selected to meet various needs better. By way of example, two or more shafts 10 may be provided and uniformly arranged along the circumferential direction of the first sheave 1. For instance, in FIG. 4, three mounting holes 12 are uniformly opened along the circumferential direction on the side 11 of the first sheave 1 facing the centrifugal mechanism 4, each for mounting one shaft 10 therein. That is, these shafts 10 are uniformly arranged along the circumferential direction of the first sheave 1 at an interval of 60° from each other.

In the exemplary embodiment, the torsion spring 9 is fitted around at least one of the shafts 10, and the first end 91 of the torsion spring 9 is coupled to the first sheave 1 while the second end 92 of the torsion spring 9 is coupled to the centrifugal mechanism 4, more specifically to the weight member 41 of the centrifugal mechanism 4. Although only one shaft 10 is provided to be fitted around one torsion spring 9 in the exemplary embodiment, it should be understood that two or more torsion springs 9 might be simultaneously fitted around the same shaft 10, or none torsion spring might be fitted around a certain shaft 10 in actual applications. The invention allows for a flexible arrangement such as what is described above, so as to fully accommodate various possible needs in different situations of application, and also allows for flexible design and adjustment of all the aspects such as the type, configuration, and number of the torsion spring 9 depending on different applications.

It should be noted that, compared with the prior art, since there is no limitation on space arrangement in the technical solutions of the present invention, when the torsion spring 9 is mounted on the shaft 10, it can be set to have a relatively larger amount of pre-twisting. Namely, it can provide a relatively larger pre-set spring load, which has a positive influence on sufficiently ensuring and also improving the operational stability of the overspeed governor, and which has a more significant advantage in terms of, for example, a high speed overspeed governor. Setting a larger pre-set spring load in an overspeed governor can make its operation more stable and reliable, thereby effectively avoiding or eliminating the interference of mis-operation caused by abnormal behavior of some elevator passengers in the elevator car. It can also, for example, allow the overspeed governor assembly and the associated safety device to make a faster response.

Additionally, since the invention has the outstanding advantages in terms of spatial arrangement as described above, a plurality of torsion springs 9 can be simultaneously disposed around the same shaft 10 in some applications. Accordingly, sufficient redundancy can be obtained to prevent the safety risk caused by malfunction or failure of one or some of the torsion springs 9 during operation, which is extremely beneficial for ensuring and significantly improving the safety and reliability of the overspeed governor assembly.

In contrast, when the extension spring approach is commonly used in the prior art (i.e. one or more extension springs are provided to connect the weight member in the centrifugal mechanism of the overspeed governor assembly), the extension spring cannot be loaded a larger spring pre-extension and it is also impossible to simultaneously arrange more extension springs in the existing overspeed governors, due to the structure limitation of the extension spring(s) and the internal space limitation of the overspeed governors. As a result, none of the technical advantages of the invention as described above can be possibly reached by the prior art.

Still referring to FIG. 4, optionally, an accommodating portion 13 may be provided in the outer peripheral area of the mounting hole 12 (i.e., the shaft 10), for example, in the form of a slot or the like for accommodating the first end 91 of the torsion spring 9. As further shown in FIG. 6, a receiving portion 43 may be optionally provided on the side 42 of the centrifugal mechanism 4 facing the first sheave 1, for example, in the form of a slot or the like for receiving the second end 92 of the torsion spring 9. In this way, the torsion spring 9 can be mounted very stably and reliably between the centrifugal mechanism 4 and the first sheave 1, for providing a stable pre-set load better, which is considerably beneficial for ensuring and improving the performance of the overspeed governor assembly.

More specifically, by way of example, the above-described accommodating portion 13 located on the first sheave 1 may be arranged to have two or more slots which are disposed along the circumferential direction of the shaft 10. These slots may be arranged uniformly or un-uniformly, and their shapes, structural dimensions, and the like may be the same or different from each other. Any changes or adjustments to the accommodating portion 13 in terms of configuration, arrangement position, amount, etc., are possible and permissible in the technical solutions according to the invention.

Furthermore, it is contemplated that the first end 91 of some or all of the torsion springs 9 may be optionally configured to have an operating portion so that the first end 91 can be conveniently and easily decoupled from the accommodating portion 13, for example, by means of an operation such as pulling after the first end 91 is placed in the accommodating portion 13.

Figure 5:
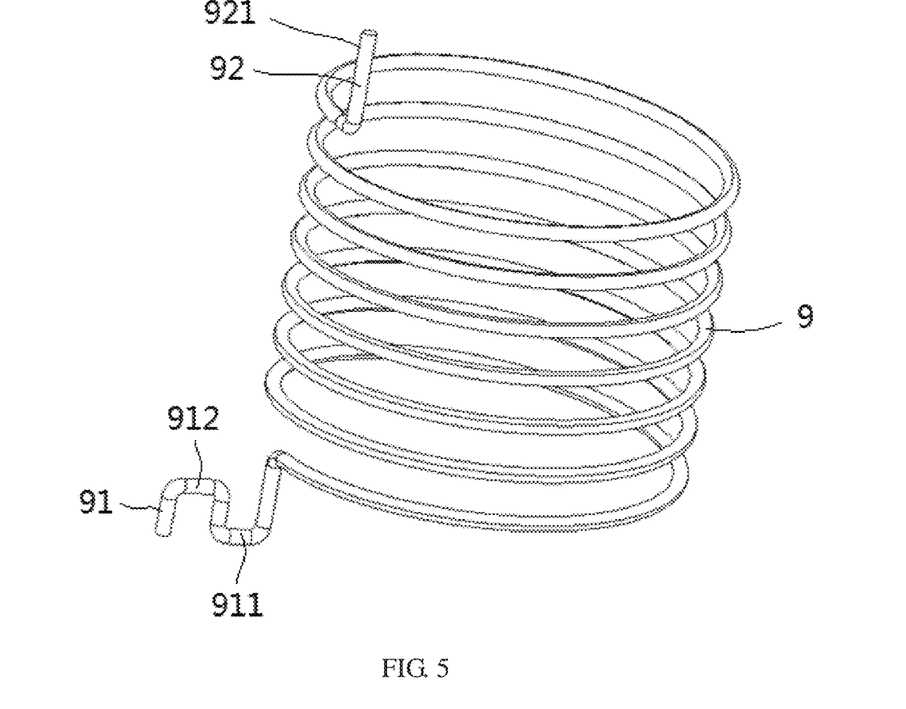
FIG. 5 is a perspective view of an embodiment of a torsion spring in the overspeed governor assembly embodiment shown in FIG. 1.
Figure 7:
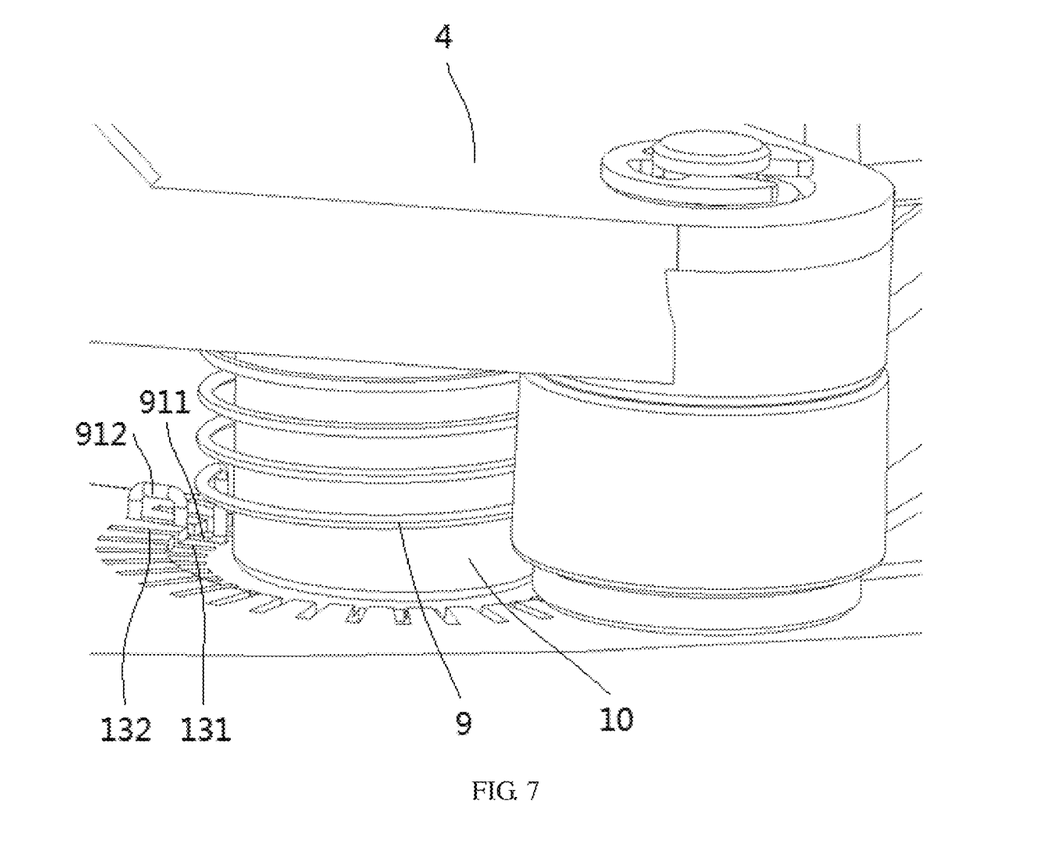
FIG. 7 is another partial perspective view illustrating the torsion spring embodiment shown in FIG. 4 after being mounted into the overspeed governor assembly embodiment.

By way of example only, as shown in FIGS. 5 and 7, the first end 91 may be optionally configured to have two different sections, namely a first section 911 and a second section 912. The two sections will be placed in the accommodating portion 13 on the first sheave 1, and the portion of the second section 912 protruding outwardly from the accommodating portion 13 can be used as the aforementioned operating portion on the torsion spring 9. That is to say, such an outward protrusion will help one to perform an operation such as lifting or pulling, in order to pull the first end 91 of the torsion spring 9 out of the accommodating portion 13. Thereby, other operations may be performed subsequently, for example, the first end 91 may be changed to other slots of the accommodating portion 13, or the torsion spring 9 may be detached from the shaft 10, and so on.

Still referring to FIG. 7, optionally, the structure such as a slot serving as the accommodating portion 13 may be configured to have a first portion 131 and a second portion 132. The two portions may remain different from each other in the axial direction and/or the radial direction of the mounting hole 12 (i.e., the shaft 10). For example, in the embodiment provided herein, the first portion 131 may be configured to be farther away from the centrifugation mechanism 4 in the axial direction than the second portion 132 and closer to the central axis of the shaft 10 in the radial direction than the second portion 132. Namely, a stepped structure as shown in FIG. 7 may be formed, which would not only be very advantageous to allow stable and reliable fixing and support of the torsion spring 9 from different orientations within the 360° annular range, but also help to form an cooperation with the aforementioned operating portion of the torsion spring 9 to perform an operation such as displacement of the first end 91 of the torsion spring 9. Accordingly, the amount of the pre-set load provided by the torsion spring 9 can be flexibly changed and adjusted via adjusting the torsion angle of the torsion spring 9. For instance, in some applications, one or some of the torsion springs 9 may be set to reach their own limits after being installed and twisted so that the torsion spring(s) have a considerable amount of spring pre-extension, and the torsion angle of one or some of the torsion springs 9 can even be greater than 360°. Such a technical advantage can in no way be achieved with the existing approach using an extension spring.

Of course, it should be noted that the invention also allows the accommodating portion 13 to be arranged to have three or more portions at the same time, if needed. Therefore, the combined arrangement of these portions can provide more variant configurations which might better meet certain requirements of actual applications.

Figure 6:
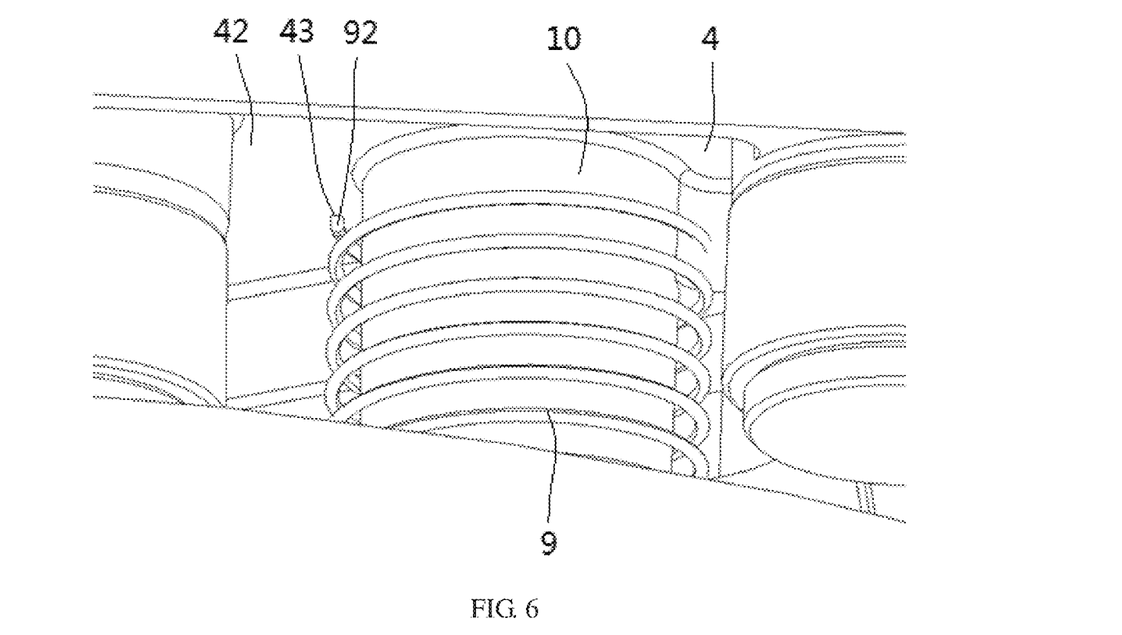
FIG. 6 is a partial perspective view showing the torsion spring embodiment shown in FIG. 4 after being mounted into the overspeed governor assembly embodiment.

Additionally, the second end 92 of the torsion spring 9 may optionally be configured to have an extension 921 which may extend, for example, in a straight line along the axial direction of the torsion spring 9, and a part or all of it may be placed in the receiving portion 43 which is, for example, directly disposed on the weight member 41 of the centrifugal mechanism 4. By way of example, the receiving portion 43 of the centrifugal mechanism 4 may be configured in any suitable configuration such as a slot, as shown in FIG. 6, so that the extension 921 of the torsion spring 9 may be directly inserted into the receiving portion 43 to fix and couple the second end 92 onto the weight member 41 of the centrifugal mechanism 4, and then the first end 91 of the torsion spring 9 can, as previously described, be flexibly mounted into the accommodating portion 13 of the first sheave 1 in accordance with the application requirements, or adjusted as to its position in the accommodating portion 13.

In view of the fact that the overspeed governor assembly according to the invention has the technical advantages described above that are significantly superior to the prior art, it is suitable to be applied in elevator safety systems and elevator systems to overcome the drawbacks and deficiencies in the prior art including those described hereinbefore.

For example, in another technical solution according to the invention, it is provided an elevator safety system disposed with the overspeed governor assembly designed and provided in accordance with the invention. By disposing such an overspeed governor assembly, the safety device of the elevator safety system can be triggered when an elevator car overspeed is occurring, so that the safety device is able to perform safety measures such as speed limiting and braking, so as to deal with the over-speeding problem of the elevator car. As a result, a function for protecting people and equipment can be exercised by the system.

In addition, as another aspect significantly superior than the prior art, the present invention also provides an elevator system in which may be disposed the overspeed governor assembly according to the invention. For example, the overspeed governor assembly may be disposed at any appropriate position such as on an elevator car in the elevator system, so that the safety device in the elevator system can be triggered through the overspeed governor assembly to implement safety measures when over-speeding occurs to an elevator car moving along the guide rails in the elevator system, thereby achieving timely and reliable security and exerting the outstanding technical advantages of the invention as compared with the prior art.

The overspeed governor assembly for an elevator system, the elevator safety system, and the elevator system in accordance with the present invention have been exemplified in detail by way of example only. The examples are merely illustrative of the principles of the invention and its embodiments and are not intended to limit the invention. Various modifications and improvements can be made by those skilled in the art without departing from the spirit and scope of the invention. Therefore, all equivalent technical solutions should be considered and construed to be within the scope of the invention and are defined by the accompanying claims.

What is claimed is:

1. An overspeed governor assembly for an elevator system, comprising:
   an overspeed governor; and
   a linkage provided to enable the overspeed governor to associate with a safety device of the elevator, when an elevator car overspeed is occurring, to trigger the safety device to perform safety measures;
   characterized in that the overspeed governor comprises at least one torsion spring coupled between a sheave and a centrifugal mechanism in the overspeed governor for providing a pre-set load, and a centrifugal force formed by the centrifugal mechanism when the elevator car overspeed is occurring, is greater than the pre-set load for triggering the safety device via the linkage;
   wherein the centrifugal mechanism is mounted, via at least one shaft, on the sheave for rotating therewith, at least one of the torsion springs is fitted around at least one of the shafts and a first end and a second end of the at least one of the torsion springs are coupled to the sheave and the centrifugal mechanism, respectively;
   wherein the shaft is mounted on the side of the sheave facing the centrifugal mechanism, and an accommodating portion is provided in the outer peripheral area of the shaft, for accommodating the first end of the torsion spring;
   wherein the accommodating portion is configured as two or more slots arranged along the circumferential direction of the shaft;
   wherein the two or more slots are configured to have at least a first portion and a second portion, the first portion being different from the second portion in an axial direction and/or a radial direction of the shaft.

2. The overspeed governor assembly according to claim 1, wherein there are two or more shafts uniformly arranged along a circumferential direction of the sheave.

3. The overspeed governor assembly according to claim 1, a receiving portion is provided on the side of the centrifugal mechanism facing the sheave, for receiving the second end of the torsion spring.

4. The overspeed governor assembly according to claim 3, wherein
   the first end is configured to have an operating portion being operable to decouple the first end from the accommodating portion after the first end is accommodated in the accommodating portion.

5. The overspeed governor assembly according to claim 3, wherein the second end is configured to have an extension extending along the axial direction of the torsion spring, and the receiving portion is configured as a hole for receiving at least a portion of the extension.

6. The overspeed governor assembly according to claim 1, wherein the first portion is farther away from the centrifugal mechanism in the axial direction than the second portion and closer to the central axis of the shaft in the radial direction than the second portion, and the first end is configured to have a first section accommodated in the first portion, and a second section in which the operating portion is disposed and configured to have an outward protrusion after the second section is accommodated in the second portion.

7. The overspeed governor assembly according to claim 1, wherein the sheave and the safety device are mounted on an elevator car.

8. The overspeed governor assembly according to claim 7, wherein the safety device is a safety tongs pulling mechanism, and the linkage is configured in the shape of an arm for being coupled to the safety tongs pulling mechanism.

9. An elevator safety system, comprising:
   a safety device configured to perform safe measures when an elevator car overspeed is occurring; and
   an overspeed governor assembly for an elevator system according to claim 1, arranged to trigger the safety device when the elevator car overspeed is occurring.

10. An elevator system, comprising:
    a guide rail;
    an elevator car being movable along the guide rail; and
    an overspeed governor assembly for an elevator system according to claim 6, arranged to trigger an safety device of the elevator to perform safe measures when an elevator car overspeed is occurring.

11. An overspeed governor assembly for an elevator system, comprising:
    an overspeed governor; and
    a linkage provided to enable the overspeed governor to associate with a safety device of the elevator, when an elevator car overspeed is occurring, to trigger the safety device to perform safety measures;
    wherein the overspeed governor comprises at least one torsion spring coupled between a sheave and a centrifugal mechanism in the overspeed governor for providing a pre-set load, and a centrifugal force formed by the centrifugal mechanism when the elevator car overspeed is occurring, is greater than the pre-set load, for triggering the safety device via the linkage;
    wherein the centrifugal mechanism is mounted, via at least one shaft, on the sheave for rotating therewith, at least one of the torsion springs is fitted around at least one of the at least one shaft and a first end and a second end thereof are coupled to the sheave and the centrifugal mechanism, respectively;
    wherein the at least one shaft is mounted on the side of the sheave facing the centrifugal mechanism, and an accommodating portion is provided in the outer peripheral area of the at least one shaft, for accommodating the first end of the torsion spring;
    wherein the accommodating portion is configured as two or more slots arranged along a circumferential direction of the at least one shaft.

* * * * *